(12) United States Patent
Suenaga et al.

(10) Patent No.: US 9,180,607 B2
(45) Date of Patent: Nov. 10, 2015

(54) MOLD AND METHOD FOR MOLDING RESIN FOAMED MOLDING

(75) Inventors: Kazuyuki Suenaga, Tosu (JP); Tomoyuki Motomura, Tosu (JP)

(73) Assignee: BRIDGESTONE CORPORATION, Tokyo (JP)

(*) Notice: Subject to any disclaimer, the term of this patent is extended or adjusted under 35 U.S.C. 154(b) by 472 days.

(21) Appl. No.: 12/992,136

(22) PCT Filed: May 20, 2009

(86) PCT No.: PCT/JP2009/059263
§ 371 (c)(1),
(2), (4) Date: Nov. 11, 2010

(87) PCT Pub. No.: WO2009/145089
PCT Pub. Date: Dec. 3, 2009

(65) Prior Publication Data
US 2011/0062614 A1    Mar. 17, 2011

(30) Foreign Application Priority Data
May 30, 2008    (JP) ................... 2008-143027

(51) Int. Cl.
*B29C 33/10* (2006.01)
*B29C 37/00* (2006.01)
*B29C 44/58* (2006.01)

(52) U.S. Cl.
CPC ............. *B29C 33/10* (2013.01); *B29C 37/006* (2013.01); *B29C 44/587* (2013.01); *B29C 44/588* (2013.01); *Y10S 425/812* (2013.01)

(58) Field of Classification Search
CPC .... B29C 33/10; B29C 44/588; B29C 44/587; B29C 37/006; Y10S 425/812; B22D 17/14; B22D 17/145

USPC .............. 425/4 R, 127, 401, 546, 812, 817 R; 249/141

See application file for complete search history.

(56) References Cited

U.S. PATENT DOCUMENTS 3,704,081 A * 11/1972 Immel ............................ 425/4 R
3,941,528 A * 3/1976 Cotterell ........................ 425/4 R
(Continued)

FOREIGN PATENT DOCUMENTS

DE    4327832 A1 *    2/1995    .............. B29C 67/20
GB    840883    *    7/1960    .............. B29C 33/10
(Continued)

OTHER PUBLICATIONS

International Search Report dated Aug. 4, 2009 (8 pages).
(Continued)

*Primary Examiner* — Seyed Masoud Malekzadeh
(74) *Attorney, Agent, or Firm* — Sughrue Mion, PLLC

(57) ABSTRACT

Provided is a mold configured to properly exhaust gas from a cavity and to prevent resin from entering into a vent hole, and a method for molding resin foamed molding using the mold. The mold (1) includes lower mold (2), upper mold (4), and core mold (3). The core mold (3) is provided at wall portions (3*b*), (3*c*) thereof with respective vent holes (6). Annexed members (7) are detachably attached to the outer surface sides of wall portions (3*b*), (3*c*). Each of the annexed members (7) has a tubular shape having an air passage in communication with the vent hole, and a sectional dimension smaller than that of vent hole (6). A nonwoven cloth (10) is attached to core mold (3) so as to cover each surface thereof facing the cavity, and cover wall portions (3*b*), (3*c*), thereby covering vent hole (6) from the cavity side.

4 Claims, 4 Drawing Sheets

(56) References Cited

U.S. PATENT DOCUMENTS

| | | | |
|---|---|---|---|
| 4,102,721 A * | 7/1978 | Carey, Jr. | 156/79 |
| 4,139,177 A * | 2/1979 | Hanning | 249/66.1 |
| 4,267,142 A * | 5/1981 | Lankheet | 264/510 |
| 4,327,045 A * | 4/1982 | Nishikawa et al. | 264/51 |
| 4,801,361 A * | 1/1989 | Bullard et al. | 264/40.6 |
| 4,813,859 A * | 3/1989 | Bullard et al. | 425/4 R |
| 4,822,542 A * | 4/1989 | Kuwabara et al. | 264/50 |
| 5,281,383 A * | 1/1994 | Ueki et al. | 264/259 |
| 5,482,721 A * | 1/1996 | Clark et al. | 425/4 R |
| 5,587,183 A * | 12/1996 | Clark et al. | 425/4 R |
| 5,589,202 A * | 12/1996 | Okano et al. | 425/73 |
| 5,723,152 A * | 3/1998 | Hirata et al. | 425/4 R |
| 5,965,169 A * | 10/1999 | Hirata et al. | 425/4 R |
| RE36,572 E * | 2/2000 | Clark et al. | 425/4 R |
| 6,036,899 A * | 3/2000 | Iwai et al. | 264/51 |
| 6,558,592 B1 * | 5/2003 | Nohara et al. | 264/51 |
| 6,843,940 B2 * | 1/2005 | Reed et al. | 264/2.2 |
| 6,988,878 B2 * | 1/2006 | Ito et al. | 425/4 R |
| 7,056,457 B2 * | 6/2006 | Senoo | 264/46.4 |
| 7,481,637 B2 * | 1/2009 | Cathcart et al. | 425/4 R |
| 2004/0090106 A1 * | 5/2004 | Senoo | 297/452.48 |
| 2005/0253293 A1 * | 11/2005 | Cathcart et al. | 264/41 |
| 2007/0057409 A1 * | 3/2007 | Sato | 264/335 |

FOREIGN PATENT DOCUMENTS

| | | |
|---|---|---|
| JP | 57-006732 A | 1/1982 |
| JP | 4-312811 A | 11/1992 |
| JP | 2004-58494 A | 2/2004 |
| JP | 2005-88428 A | 4/2005 |
| JP | 2006-192831 A | 7/2006 |
| JP | 2006192831 A * | 7/2006 |
| JP | 2008-23084 A | 2/2008 |

OTHER PUBLICATIONS

Japanese Office Action, dated Jun. 18, 2013, issued in corresponding Japanese Patent Application No. 2008-143027.

* cited by examiner

MOLD AND METHOD FOR MOLDING RESIN FOAMED MOLDING

FIELD OF INVENTION

The present invention relates to a mold for forming resin foamed moldings such as a seat cushion for vehicles, and a method for molding resin foamed moldings using the mold.

BACKGROUND OF INVENTION

There have conventionally been used foamed moldings such as soft polyurethane foamed moldings for interior parts example of which include a seat and a door of a vehicle such as an automobile or an electric train. In a manufacturing process of the foamed moldings, a certain amount of foam resin material for forming the soft polyurethane foam is supplied in the forming mold, first. Then, the forming mold is closed, and the foam resin material is foamed and cured. The foam resin material is gradually filled in a cavity while expanding, and forms into a shape corresponding to the cavity. In this process, if a gas such as carbon dioxide generated by air existing inside the mold or by a foaming reaction is not properly exhausted outside the mold, defects such as an underfill or a void can be formed in the molding.

Therefore, there is a known concept of providing a vent hole in the forming mold to exhaust the gas inside the mold. However, simply providing the vent hole may exhaust the foam resin material filled in the cavity outside the mold through the vent hole, thereby causing problems such as material loss and necessary cleaning of the vent hole.

As shown in FIGS. 4 and 5, as a mold 30 configured to prevent a material from being exhausted from a vent hole, Japanese Unexamined Patent Application Publication No. 2006-192831 discloses a configuration where the inside of a forming mold is provided with a plate-like slab having air permeability on which a non-air-permeability sheet 32 capable of covering a vent hole 31 is adhered, or provided with a nonwoven cloth 33. With this mold 30, gas flows out through the vent hole 31 via the slab or the nonwoven cloth 33, in the foaming process. When the inside of the cavity 34 is filled with resin 35, the foaming pressure of the foam resin material causes the non-air-permeability sheet 32 to press against the vent hole 31 to close the vent hole 31. As a result, the resin is prevented from entering the vent hole 31.

Patent Literature 1: Japanese Unexamined Patent Application Publication No. 2006-192831

SUMMARY OF INVENTION

In the mold 30 disclosed in the above Japanese Unexamined Patent Application Publication No. 2006-192831, the vent hole 31 is directly opened to the atmosphere, and thus the velocity of the gas flowing out through the cavity 34 and the vent hole 31 to the outside of the mold is high. Therefore, the foam resin 35 in the cavity 34 moves inside the cavity 34 toward the vent hole 31, and thus the non-air-permeability sheet 32 closes the vent hole 31 before the cavity 34 is filled with the resin 35, whereby the gas inside the cavity 34 cannot be exhausted properly.

Moreover, in the mold 30 disclosed in Japanese Unexamined Patent Application Publication No. 2006-192831, the vent hole 31 is provided at a ceiling portion of the mold 30, so that there are required pins 36 for installing the slab or the nonwoven cloth 33, which faces the vent hole 31, on the ceiling surface of the cavity, resulting in a complicated configuration of the mold 30.

It is therefore an object of the present invention to provide a mold which can solve the above conventional problems, and is provided with a configuration to be able to properly exhaust gas from the cavity and prevent resin from entering the vent hole, and to provide a method for molding a resin foamed molding using the mold.

The mold according to a first aspect is characterized in that it has a cavity enclosed by at least an upper mold and a lower mold, wherein the mold is designed for resin foam moldings, and the cavity includes a cavity main portion to be supplied with foam resin material, and a cavity end portion to be filled with expanded resin which starts foaming in the cavity main body, in which the cavity end portion is provided at a vertical surface thereof with a vent hole.

The mold according to a second aspect is characterized in, in addition to the first aspect, that an annexed member having an air passage in communication with the vent hole is detachably installed.

The mold according to a third aspect is characterized in, in addition to the second aspect, that at least a part of the sectional dimension of the passage of the air passage is smaller than that of the vent hole.

The mold according to a fourth aspect is characterized in, in addition to any one of the first to the third aspects, that the vent hole is covered at the cavity side thereof with an air permeability material.

The mold according to a fifth aspect is characterized in, in addition to the fourth aspect, that the air permeability material is made of a nonwoven cloth, a slab, a press felt, or a urethane compressed chip material.

The mold according to a sixth aspect is characterized in, in addition to the fourth or the fifth aspect, that the mold includes a core mold, the vent hole is provided in the core mold, and the air permeability material is attached to the core mold.

The mold according to a seventh aspect is characterized in, in addition to any one of the first to sixth aspects, that the mold is used for molding a seat pad for vehicles; the cavity end portion is disposed above the cavity main portion, and the cavity main portion and the cavity end portion communicate with each other through a cavity side portion; and the vent hole is provided at a vertical surface in the opposite side of the cavity side portion.

The mold according to an eighth aspect is characterized in, in addition to the seventh aspect, that the vent hole is provided at the vertical surface furthest from the cavity side portion.

A method for molding a resin foamed molding according to a ninth aspect uses the mold in any one of the first to eighth aspects.

In the mold and the molding method according to the invention, the vent hole is provided in the vertical surface of the main cavity portion of the mold. In the foam molding process, the resin foamed in the cavity eventually reaches the cavity end, and when gas generated during the foam molding process or air in the cavity exists in a space between the resin and the wall surface of the cavity, there is no route for the gas or air to escape outside, and thereby an air accumulation area is formed, which may result in the formation of a defect when filling the resin. On the other hand, when the vent hole is provided in the cavity like the above configuration, remaining gas flows out through the vent hole, and thus the formation of a defect when filling the resin is prevented.

In one aspect of the mold according to the invention, the annexed member having the air passage in communication with the vent hole is detachably installed. Therefore, the flow resistance of the gas flowing out from the vent hole through the air passage of the annexed member is high, so that the gas does not flow out swiftly from the vent hole. Consequently, the resin foaming in the cavity receives reaction pressure from the gas remaining in the cavity end portion, and gradually expands so as to sequentially fill the inside of the cavity.

As a result, the cavity is fully filled with the resin, thereby making it possible to form a molding without defects such as an underfill.

By adjusting the sectional dimension of the passage of at least a part of the air passage of the annexed member, which communicates with the vent hole, smaller than the vent hole, it is possible to control the velocity of the gas flowing out from the cavity.

Covering the vent hole at the cavity side thereof with an air permeability material can prevent the resin from entering the vent hole.

As the air permeability, a nonwoven cloth, a slab, a press felt, or a urethane compressed chip material is preferable.

In conventional molded products such as a seat pad for vehicles, a product in which urethane is integrated with felt or the like is occasionally used. When performing a foam molding by attaching an air permeability material such as felt to a core mold, it is preferable to cover the cavity side of the vent hole with the air permeability material.

In this invention, the vent hole is provided in the vertical surface of the cavity surface of the upper mold, so that the vent hole can be covered with the air permeability material by extending part of the air permeability material attached to the core mold. For that reason, pins for attaching the air permeability material to the cavity surface are not needed, and thus the configuration of the mold is simplified.

The mold according to the invention is suitable for molding products such as a seat pad for vehicles. As a mold for molding a seat pad for vehicles, there is one where a cavity end portion is disposed above a cavity main portion, the cavity main portion and the cavity end portion communicate with each other via a cavity side portion, and vent holes are provided in the cavity side portion and a vertical surface opposing the cavity side portion. In such a mold, resin, as it starts foaming, flows from the cavity main portion through the cavity side portion, flows upward, and foams so as to fill the inside of the cavity end portion. Accordingly, the cavity can be fully filled with the resin by providing the vent hole in the cavity end portion at a vertical surface thereof opposing the cavity side portion, particularly the vertical surface furthest from the cavity side portion.

DETAILED DESCRIPTIONS

Preferred embodiments of a mold and a method for molding a resin foamed molding according to the present invention will be described hereinafter with reference to the drawings.

Figure 1:
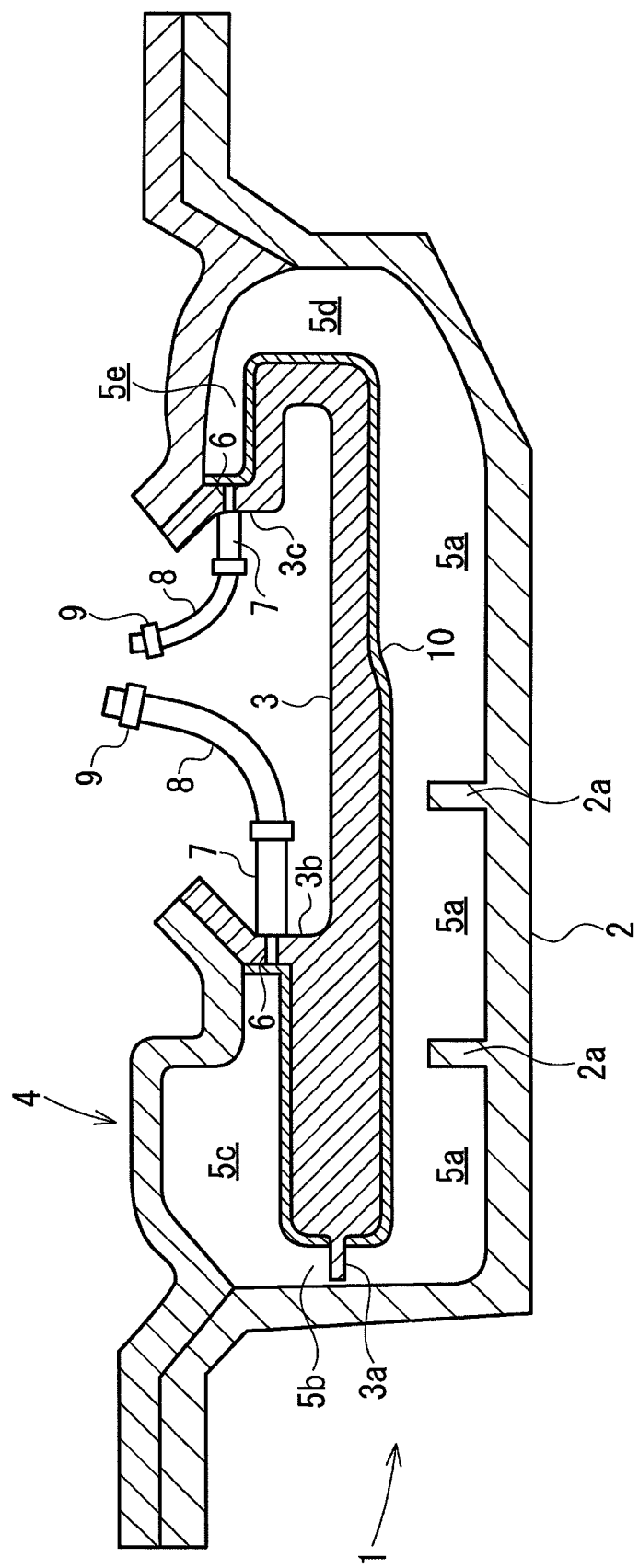
FIG. 1 is a vertical cross-sectional view of a mold according to a preferred embodiment.
Figure 2:
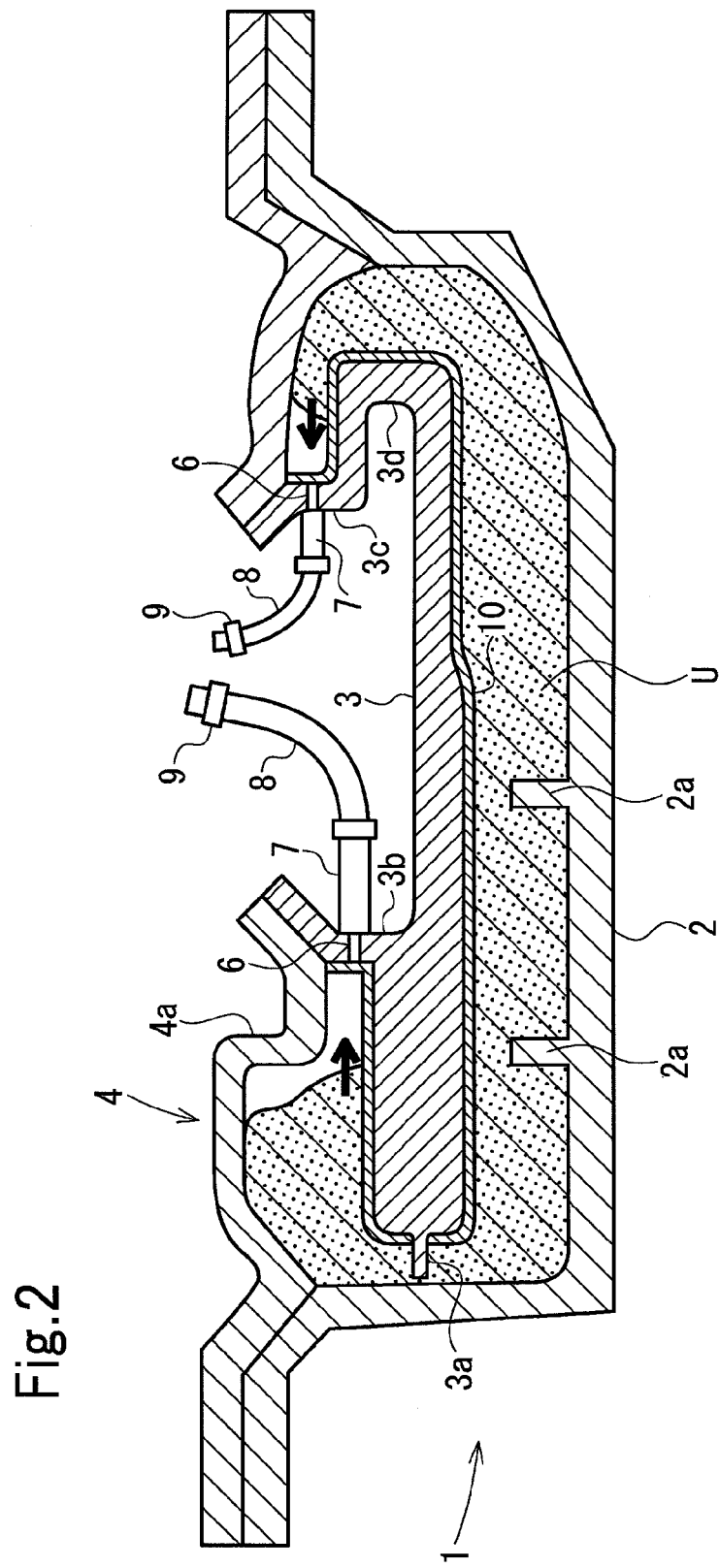
FIG. 2 is a cross sectional view of the mold in FIG. 1, showing a foam molding that is halfway through the molding process.
Figure 3:
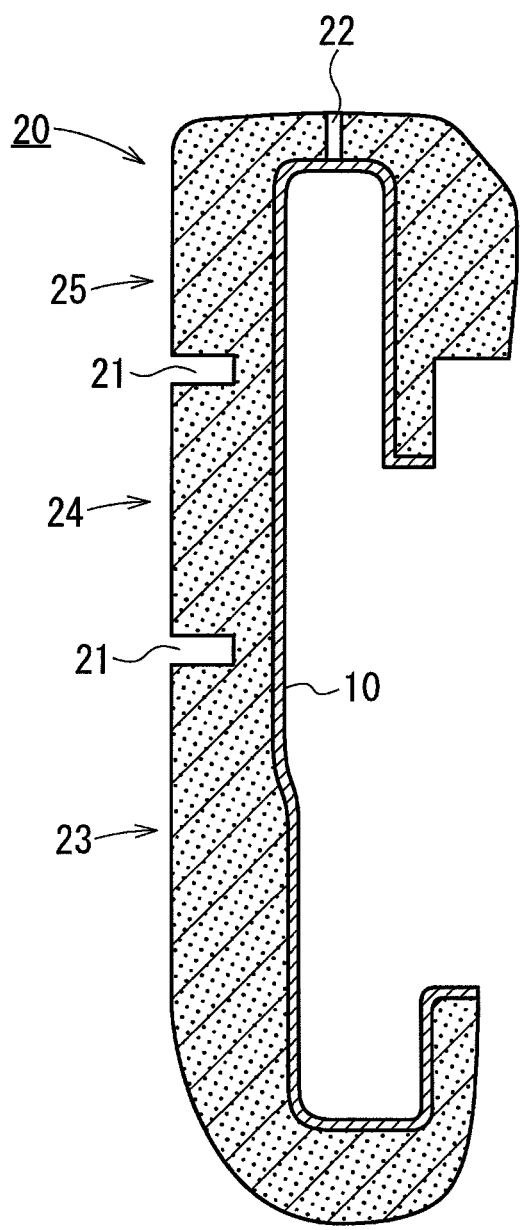
FIG. 3 is a vertical cross-sectional view of a seat pad (back pad) for a vehicle molded with the mold in FIG. 1.
Figure 4:
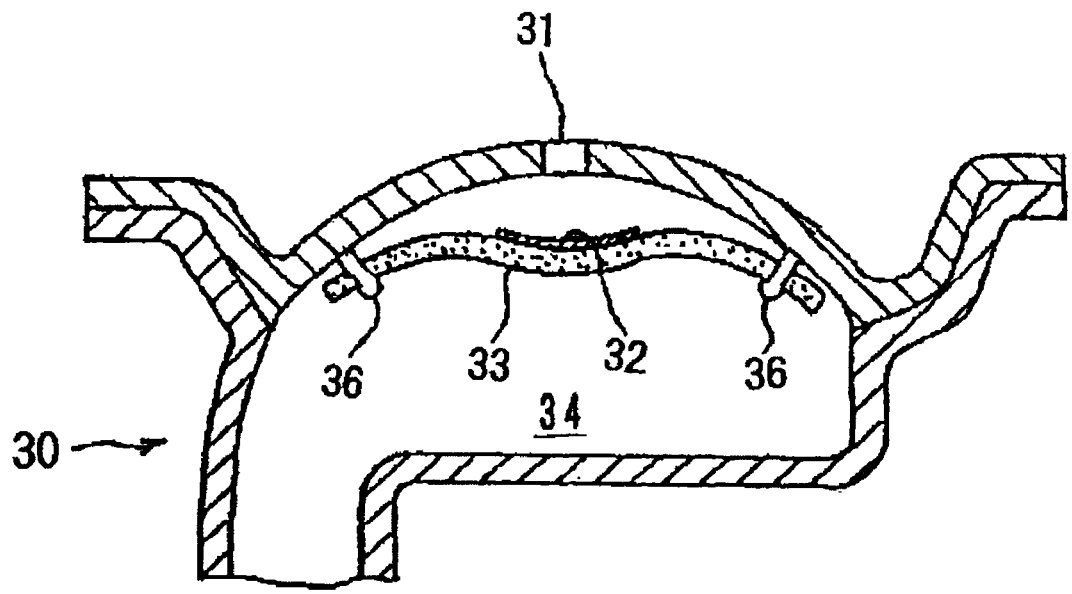
FIG. 4 is a cross-sectional view of a mold according to a conventional example.
Figure 5:
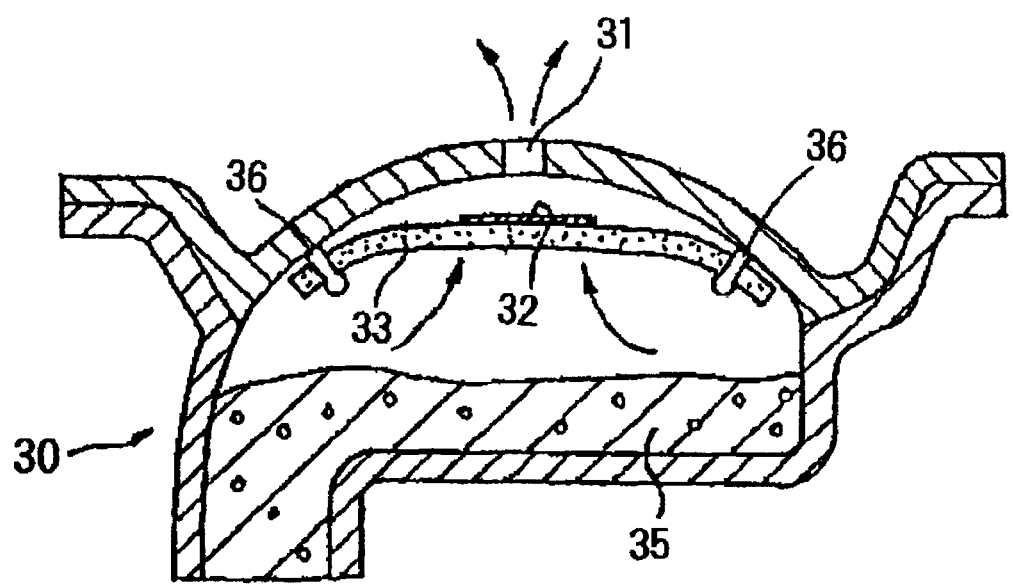
FIG. 5 is a cross-sectional view of a foam molding that is halfway through the molding process using the mold in FIG. 4.

FIG. 1 is a vertical cross-sectional view of a mold according to a preferred embodiment; FIG. 2 is a cross-sectional view of the mold showing a foam molding halfway through the molding process; and FIG. 3 is a vertical cross-sectional view of a molded seat pad (back pad) for a vehicle.

This mold 1 includes a lower mold 2, an upper mold 4, and a core mold 3 installed directly under the upper mold 4. The lower mold 2 and the upper mold 4 are die-matched at their peripheral portions. A cavity of this mold 1 includes a cavity main portion 5a below the core mold 3, a cavity side portion 5b communicating with one end side of the cavity main portion 5a, and a cavity end portion 5c communicating with the cavity side portion 5b and positioned above the core mold 3. Moreover, this cavity includes a cavity side portion 5d communicating with the other end of the cavity main portion 5a, and a cavity end portion 5e communicating with the cavity side portion 5d and positioned above the core mold 3.

On a cavity surface of the lower mold 2 facing the cavity main portion 5a, there are provided convex portions 2a for forming skin suspension grooves 21 on the back pad 20.

The core mold 3 is provided with a protrusion 3a, protruding toward the cavity side portion 5b, for forming a headrest insertion hole 22 in the back pad 20. Moreover, the core mold 3 is provided with wall portions 3b, 3c which constitute vertical surfaces at the distal rear sides of the cavity end portions 5c, 5e. The upper end sides of the wall portions 3b, 3c are die-matched with the upper mold 4.

The wall portions 3b, 3c are provided with vent holes 6, respectively. On the outer surface sides of the wall portions 3b, 3c, annexed members 7 are removably installed. Each of the annexed members 7 has a tubular shape provided with a narrow air passage in communication with the vent hole 6, and one end side thereof in the axial direction is coupled to the wall portion 3b or 3c. At least a part of the air passage of the annexed member 7 has a sectional dimension smaller than that of the vent hole 6.

The other end side of the annexed member 7 is connected with a base end of an elastic hose made of rubber, resin, or the like. The tip end side of the hose 8 is connected with a terminal member 9 having a short pipe shape. The vent hole 6 communicates with the atmosphere through the annexed member 7, hose 8 and terminal member 9.

An air permeability material such as a nonwoven cloth 10, a slab, a press felt, or a urethane compressed chip material is attached on the core mold 3 so as to cover each surface thereof facing the respective cavity (the nonwoven cloth is used in this embodiment). The end portion sides of the nonwoven cloth 10 cover the wall portions 3b, 3c, thereby covering the vent holes 6 from the side of the cavity.

In this embodiment, the nonwoven cloth 10 is held to the core mold 3 by magnetic force. Although not shown in the drawings, the core mold 3 is provided with a magnet, and pieces of iron (for example, pieces of wire) are fastened to the nonwoven cloth 10 by an adhesive tape or the like. As the pieces of iron are attracted to the magnet, the nonwoven cloth 10 is held to the core mold 3. The pieces of iron and the adhesive tape are removed after a molding is removed from a mold. Instead of fastening the pieces of iron, a magnetic tape having magnetic powder such as ferrite powder can be adhered to the nonwoven cloth 10.

To mold a back pad 20, the nonwoven cloth 10 is attached to the core mold 3, first.

While holding the mold in an opened state, urethane stock solution is supplied into the cavity main portion 5a of the lower mold 2, and after the mold is closed as shown in FIG. 1, the urethane stock solution is foamed under a heating operation. The urethane U fills the cavity main portion 5a, then flows upward while filling the cavity side portions 5b, 5d, and enters the cavity end portions 5c, 5e.

Gas generated during this process and air remaining in the cavity are exhausted to the atmosphere through the vent hole 6.

This urethane foam has viscosity, and thus as shown in FIG. 2, it flows as a mass from the cavity side portions 5b, 5d to the wall portions 3b, 3c. Therefore, gas and air in the cavity end portions 5c, 5e are also exhausted through the vent holes 6. Accordingly, the cavity end portions 5c, 5e are also filled with the urethane foam. The urethane foam, then, is cured, and is removed from the opened mold.

Through that process, a back pad shown in FIG. 3 is obtained. The nonwoven cloth 10 is integrally attached to the back surface of the back pad 20 shown in FIG. 3. The skin suspension grooves 21 are provided on the front surface of the back pad 20, and the headrest insertion hole 22 is provided on the top surface thereof. The lower portion 23 of the front surface of the back pad 20 is a section which a passenger's lower back contacts, and the upper portion 25 thereof is a section which the passenger's shoulder contacts.

In the mold 1 of this embodiment, the annexed members 7 having air passages in communication with the vent holes 6 are attached to the outer surfaces of the wall portions 3b, 3c. Therefore, the flow resistance of the gas flowing out through the vent holes 6 and the annexed members 7 is high, and thus the gas does not flow out swiftly from the vent holes 6. For that reason, the resin foaming inside the cavity receives reaction pressure of the gas remaining in the cavity end portions 5c, 5e, and gradually expands so as to fill the cavity main portion 5a, cavity side portions 5b, 5d, and cavity end portions 5c, 5e in the cavity, in this order. As a result, the entire inside portion of the cavity is fully filled with the urethane, and it is thus possible to form a back pad molding with no defects such as an underfill.

Since the sectional dimension of the passage of at least a part of the air passage, which is in communication with the vent hole 6, of each annexed member 7 is arranged to be smaller than that of the vent hole 6, it is possible to control the velocity of the gas flowing out from the cavity.

The vent holes 6 at the cavity sides are covered with the nonwoven cloth 10. Since the velocity of the gas flowing out from the vent holes 6 is low, it is possible to prevent the urethane from penetrating the nonwoven clothes 10 near the vent holes 6 and entering the inside of the vent holes 6.

In this preferred embodiment, the nonwoven cloth 10 is held by the core mold 3, and the end sides of the nonwoven cloth 10 are raised along the wall portions 3b, 3c so as to cover the cavity 6, so that pins that are used to attach the nonwoven cloth 10 to the cavity surface are not needed, which simplifies the configuration of the mold.

In this mold 1, as described hereinbefore, the urethane begins to foam, flows upward from the cavity main portion 5a through the cavity side portions 5b, 5d, and foams so as to fill the cavity end portions 5c, 5e. The vent holes 6 are disposed in the vertical surfaces of the wall portions 3b, 3c which are furthest from the cavity side portions 5b, 5d, so that it is possible to fill the cavity end portions 5c, 5e with the urethane without leaving gas and air in the cavity end portions 5c, 5e. It is thus possible to mold a back pad 20 with no defaults such as an underfill.

It should be noted that even if the nonwoven cloth 10 is hardened as the urethane sinks into the nonwoven cloth 10, this nonwoven cloth 10 takes a position at the back surface side of the back pad 20 and is hidden by a member such as a back board, so that this does not negatively affect the design of the seat back.

In this preferred embodiment, it is preferable that the foaming magnification is about 30 to 60 times, the amount of gas generated is about 2 to 10 times the cavity content, the cavity content is about 10 to 25 liters, the diameter of the annexed members is about 8 to 20 mm, and the minimum diameter of the air passages of the annexed members 7 is 0.01 to 0.5 mm, but the invention is not restricted to these.

Another Preferred Embodiment

A back pad is molded in the above preferred embodiment, but the mold according to the present invention is not restricted to the back pad, and is able to provide various resin foamed moldings. Any resin other than urethane can be used.

According to the present invention, a vent hole can be provided in the core mold at its vertical direction portion 3d (see FIG. 2) facing the cavity side portion 5d, and the annexed member 7 can be connected to the vent hole.

In the present invention, the diameter of the hole of the terminal member 9 can be made smaller to decrease the amount of gas flowing out from the cavity.

Although the present invention has been described in detail with a specified embodiment, it is obvious for a person skilled in the art that the invention can be modified in various ways without departing from the aim and scope of the invention.

The present application is based on Japanese Patent Application filed on May 30, 2008 (Japanese Patent Application No. 2008-143027), and the entirety thereof is incorporated by reference.

The invention claimed is:

1. A mold characterized in having a cavity enclosed by at least an upper mold and a lower mold, the mold designed for resin foam moldings including the cavity comprising:
   a cavity main portion to be supplied with foam resin material; and
   a cavity end portion, disposed above the cavity main portion, to be filled with expanding resin which starts foaming in the cavity main portion,
   a cavity side portion communicating with one end side of the cavity main portion,
   wherein the cavity end portion is provided at a vertical surface thereof with a vent hole,
   wherein an annexed member having an air passage in communication with the vent hole is detachably installed,
   wherein at least a part of a sectional dimension of the air passage is smaller than that of the vent hole,
   wherein the vent hole is covered at the cavity side portion thereof with an air permeability material,
   wherein the vent hole communicates with an external atmosphere through the annexed member, and
   wherein the mold further comprises inside thereof a core mold that comprises wall portions which each constitute a respective vertical surface of the cavity end portion, and the vent hole is provided at a respective wall portion of the core mold,
   wherein the vent hole is provided at the respective vertical surface of the respective wall portion in an opposite side of the cavity side portion; and
   the vent hole is provided at the respective vertical surface farthest from the cavity side portion.

2. The mold according to claim 1, wherein the air permeability material is made of a nonwoven cloth, a slab, a press felt, or a urethane compressed chip material.

3. The mold according to claim 1, wherein the mold is used for molding a seat pad for vehicles;
   the cavity end portion is disposed above the cavity main portion, and the cavity main portion and the cavity end portion communicate with each other through the cavity side portion.

4. The mold according to claim 1, wherein the vent hole is provided at each of the vertical portions of the core mold.

* * * * *